June 15, 1948.  J. F. HALSTEAD  2,443,453
CIGARILLO MACHINE
Filed July 23, 1942  6 Sheets-Sheet 1

INVENTOR
JOHN F. HALSTEAD
BY George S. Hastings
ATTORNEY

June 15, 1948.  J. F. HALSTEAD  2,443,453
CIGARILLO MACHINE

Filed July 23, 1942  6 Sheets-Sheet 3

INVENTOR
JOHN F. HALSTEAD
BY George S. Hastings
ATTORNEY

June 15, 1948. J. F. HALSTEAD 2,443,453
CIGARILLO MACHINE
Filed July 23, 1942 6 Sheets-Sheet 6

INVENTOR
JOHN F. HALSTEAD
BY
George S. Hastings
ATTORNEY

Patented June 15, 1948

2,443,453

UNITED STATES PATENT OFFICE 2,443,453

CIGARILLO MACHINE

John F. Halstead, Brooklyn, N. Y., assignor to International Cigar Machinery Company, a corporation of New Jersey Application July 23, 1942, Serial No. 452,001

10 Claims. (Cl. 131—82)

This invention relates to cigar making machines, more particularly to machines for making short filler cigars, wherein the cigar bunches are molded to the required shape before the outer wrapper is applied thereto. Heretofore in short filler machines of the type shown in the patent to H. H. Wheeler, No. 2,157,537, issued May 9, 1939, there was provided a turret having shaping pockets wherein the cigar bunches were inserted and shaped by pressing mold covers upon the inserted bunches. The mold turret of the prior machines referred to was provided with an electric heating unit which heated the pockets to a temperature at which the inserted bunches were sufficiently dried out to retain their molded shape. To obtain the proper temperature of the pockets it was necessary to turn on the heating unit nearly an hour before molding the cigar bunches, and the attendants often began operating the mold turret before the pockets had attained the proper temperature. One of the objects of the present invention is to provide a mold turret construction which will not require pre-heating, and to this end there is provided a plurality of heated shapers which engage the bunches in the pockets and shape and dry the same sufficiently so that they will retain their molded shape. The mold turret construction, the heated shapers and the mechanism for operating the same forms the subject matter of my divisional application Serial No. 720,960, filed January 9, 1947.

Another object of the invention is to automatically transfer the cigar bunches delivered from the bunch rolling mechanism to the pockets of the mold turret. The head end of the pocket at the bunch receiving station is always at the same position, regardless of variations in the lengths of the mold pockets to accommodate different lengths of bunches, wherefore the head end of the bunch delivered to said pocket should be at the same position relative to the head end of said pocket to obtain uniform bunch heads. Only one length of cigar bunch delivered from the bunch rolling mechanism of a short filler cigar machine will have its head end at a point where it will coincide with the head end of the pocket in which it is deposited. Accordingly, in the case of short filler machines, any length of cigar bunch longer than the one length whose head end will coincide with the head end of the pocket when deposited therein, must be displaced axially away from the head end of the bunch while being transferred to the pocket, if its head end is to coincide with the head end of the pocket. In the case of bunches which are shorter than the one length whose head end will coincide with the head end of the pocket into which it is inserted, the bunch being transferred to the pocket must be displaced axially toward the head end of the bunch so that its head end will coincide with the head end of the pocket in which it is deposited. With short filler machines having a straight rolling table the head end of various lengths of bunches delivered from the rolling table will always lie at the same point, although on a curved rolling table the short filler bunch will be displaced toward its head end so that the bunch delivered from the table needs to be displaced axially to cause its head end to be positioned properly in the head end of the mold pocket in which it is inserted. In the case of short filler machines, since the shorter or greater bunch lengths are obtained by correspondingly adjusting both side walls of the measuring chamber from which bunch charges are separated, varying lengths of bunches delivered from the bunch rolling table will require axial displacement toward or away from the head end thereof, depending on the length of the bunch as described above. Accordingly, still another object of the invention is to provide a bunch transfer mechanism which may be adjusted to displace the bunches axially in transit to the mold turret, toward or away from the head ends thereof so that they will be deposited in the mold pockets in the proper position to obtain bunch heads of uniform density.

A further object is to compress and flatten the bunch so that its thickness will be less than the width of the pocket into which it is inserted, and its insertion therein will be facilitated.

Figure 5:
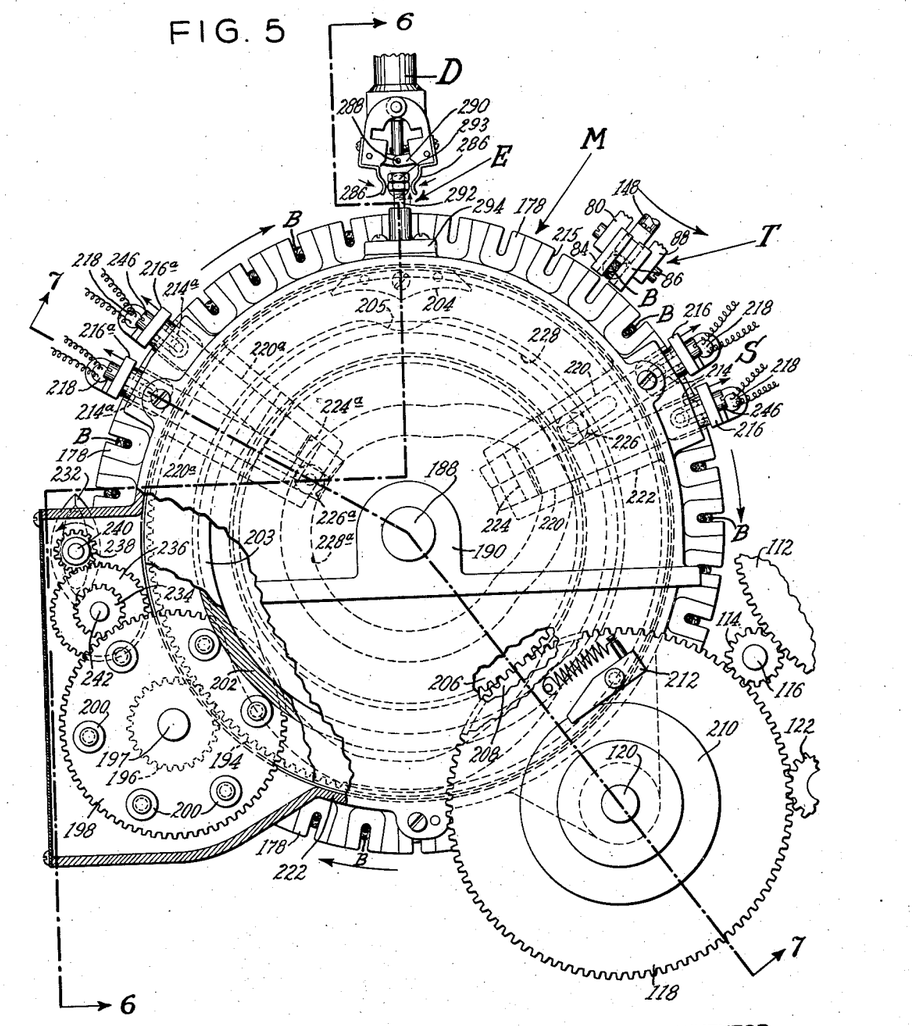
Figure 5 is an end elevation of the cigar bunch molding turret, a portion of its housing and the indexing disk being broken away to expose the remainder of the indexing mechanism.

Still another object of the invention is to provide improved mechanism for trimming the ends of the bunches projecting from slots in the ends of the shaping pockets. In Fig. 5 of the co-pending application of H. H. Wheeler, Serial No. 219,509, filed June 16, 1938, on which Patent No. 2,349,320 issued May 23, 1944, there are shown continuously rotating knives for trimming the ends of the bunches which project through the open ends of the pockets. In the construction shown in said patent, while the mold turret is advancing each pocket successively to a bunch receiving station, the rotating knives trim the projecting bunch ends with a single cut. In my construction there are provided rotary trimming knives which make successively deeper cuts in the projecting bunch ends and finally trim them off while successive pockets are advanced to a bunch-receiving station. In the Wheeler construction referred to, the continuous rotation of the knives tends to wear the ends of the mold pockets, whereas in my construction the knives rotate only while they are trimming the bunch ends. To this end the trimming mechanism is driven from the turret, so that it operates only when the turret is moving a bunch positioned in one of the pockets into the range of action of the trimming mechanism.

Still another object is to provide an improved device operated from the bunch ejecting mechanism, which removes the shaped bunch from the pocket at the bunch-ejecting station and delivers it to a bunch transfer, for closing the bunch transfer gripper jaws to grip the ejected bunch. Heretofore, with the transfer mechanism shown in the co-pending application of S. Clausen, Serial No. 396,846, filed June 6, 1941, on which Patent No. 2,334,174 issued November 16, 1943, the transfer jaws, which were connected by a toggle which held them open at the bunch ejecting station of the mold turret, were opened by an arm provided on one end of a rock-shaft extending along the ejecting station of the turret. An arm on the other end of the rock-shaft was operated by the ejector of the turret to cause the arm on the other end to trip the toggle and close the transfer jaws. In the present construction a plunger underlying the trip pin extending from the joint of the toggle is directly operated by the ejector.

In the accompanying drawings which form a part of this specification and in which like characters of reference indicate the same or like parts.

Figures 1, 2, 12:
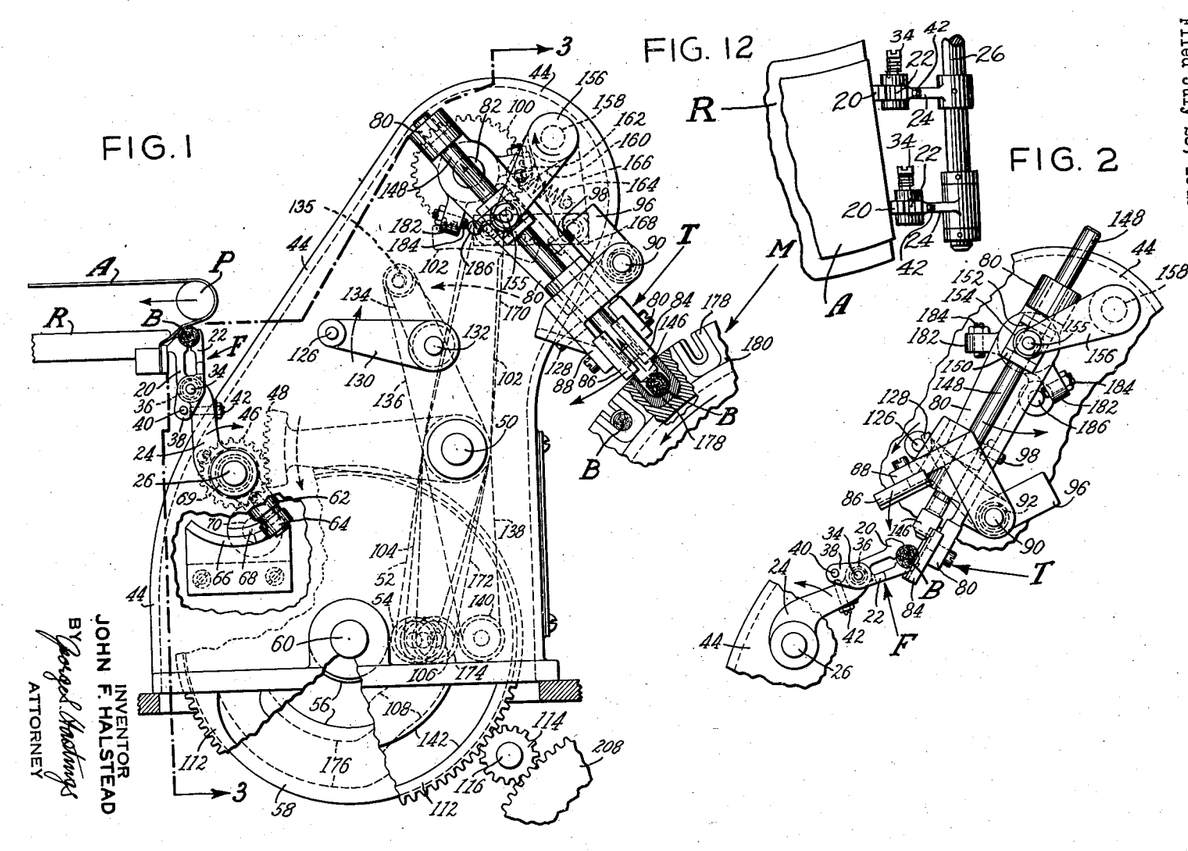
Figure 1 is an end elevation of the automatic locating and transfer mechanism for cigar bunches to be transferred from a bunch rolling table to a mold turret.
Figure 2 is an end elevation illustrating the locating fingers and transfer arm during their coacting transfer operation.
Figure 12 is a fragmentary detail view of the transfer figures engaging a curved rolling table.

With reference to Fig. 1 of the drawings, it will be seen that the cigar bunches B produced on a rolling table R of a cigar bunch machine (not shown), by the coaction of a rolling pin P and an apron A of usual construction, are delivered into pairs of transfer fingers F waiting in readiness at the end of the rolling table R. Each pair of transfer fingers consists of a stationary jaw 20 and a hinged jaw 22. Each of the jaws 20 forms a continuation of its corresponding arm 24, one of said arms being secured to a horizontal operating shaft 26. The other arm is yieldingly mounted on the shaft 26 in a manner similar to that shown in the co-pending application of H. H. Wheeler, Serial No. 234,001 filed October 8, 1938 on which Patent No. 2,356,636 issued August 22, 1944. For this purpose a pair of collars 28 (see Fig. 3) are fastened to the shaft at either side of the yieldingly mounted arm 24 and a torsion spring 30, having one end anchored in one of the collars and its other end secured to the arm urges the latter against a pin 32 mounted on the other collar. Jaws 22 are loosely mounted on their respective studs 34 held by their respective arms 24. To each stud 34 is anchored one end of a torsion spring 36 secured at its other end to its respective jaw 22 and thereby urging the latter into closed position at all times. In order to maintain a desired opening between jaws 20 and 22, the jaws 22 are equipped with a lug 38 carrying a pin 40 which, when no bunch is in the jaws 20 and 22, bears against an opposed stop screw 42 with which each arm 24 is equipped. The location of these stop screws is somewhat improved over those previously used as no loose tobacco can reach them which might affect the proper closing of the jaws 20 and 22. The yielding mounting provided for one of the arms 24 permits the latter to be turned backwardly when it engages against the edge of a curved rolling table, as shown in Fig. 12. Since the edge of the curved rolling table is not parallel to the axis of shaft 26, the bunch delivered over said edge will not be parallel to the shaft, but the yielding of the one arm 24 will permit it to engage and align itself with the edge of the table while the other arm 24 continues moving toward the table until it also engages said edge. In this manner the jaws 20 and 22 assume a position aligned with the bunch delivered from a curved table but in the case of a straight rolling table the yielding arm 24 does not engage the edge of the table ahead of the other arm 24. It should be noted that the stop pin 32 is disposed in a predetermined position to normally maintain the yielding arm 24 in parallelism with the other arm 24. Thus when the jaws engage the edge of a straight rolling table the yielding arm 24 will not be displaced from engagement with pin 32. For the construction of a straight rolling table reference may be had to the Durning Patent No. 2,306,381 issued December 29, 1942.

Shaft 26 which operates and imparts an oscillating motion to said arms and fingers is slidably supported by suitable bearing lugs of a housing 44 and carries a gear 46 (Fig. 3) which is actuated by a gear segment 48 loosely mounted for pivotal movement only on a shaft 50 journaled in suitable bearing lugs of housing 44. Gear segment 48 is oscillated by means of a cam lever 52 connected to the hub of said segment. Cam lever 52 carries a roller 54 engaging in a cam track 56 of a cam 58 mounted on a shaft 60 supported by suitable bearings of housing 44.

Figures 3, 4:
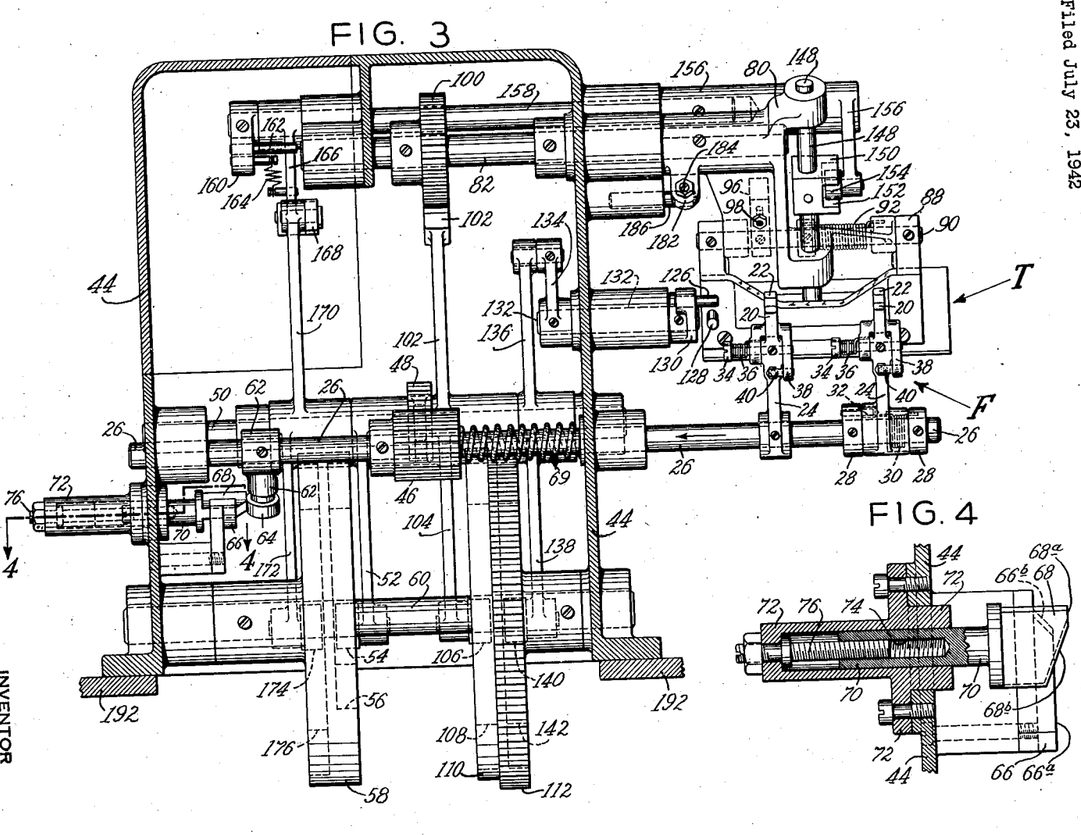
Figure 3 is a side elevation of the automatic bunch locating and transfer mechanisms as seen from line 3—3 of Figure 1, with a portion of its housing broken away.
Figure 4 is a sectional plan view taken on line 4—4 of Figure 3, illustrating the adjustability of the guide cams controlling the horizontal movement of the locating and transfer fingers.

Shaft 26 not only receives oscillating motion but is also moved axially by mechanism which will now be described. Arm 62 on shaft 26 carries a roller 64 which contacts and follows the contour of the cam faces of stationary and adjustable cam lugs or segments 66 and 68 successively during the oscillating motion of shaft 26, the roller 64 being pressed against said cam faces by a compression spring 69 mounted on shaft 26 and seated against the housing 44 and gear 46. The stationary cam lug 66 is secured to the inside wall of housing 44, and adjustable cam lug 68 projects inwardly beyond the cam face 66a of lug 66 (Fig. 4). Thus while the fingers F receive the bunch the roller 64 will engage the cam face 68a of segment 68, and during the transfer of the bunch the roller 64 will ride off the face 68a and along the inclined face 68b of segment 68 until it rides on to the cam face 66a of cam lug 66. While the roller 64 is riding along the face 68b the spring 69 will displace the shaft 26 toward the head end of the bunch supported in fingers F, that is to the left as viewed in Fig. 3. The cam segment 68 is equipped with a shank 70 which is slidably supported by a member 72 (Figs. 3 and 4) attached to housing 44. Shank 70 is provided with an internally threaded bore 74, the thread of which engages with the threaded portion of an adjusting screw 76 held in a suitable manner by member 72. By turning adjusting screw 76 the cam segment 68 can be set so that the cam faces 68a and 68b thereof project to a greater or lesser extent beyond the cam face 66a of cam lug 66. Thus the location of fingers 20 and 22 at the initial position at which they receive the cigar bunch B may be varied, so that the bunch will be displaced axially a greater or lesser degree toward its head end while being transferred. Or alternatively, by turning adjusting screw 76 the cam segment 68 may be retracted sufficiently, so that its cam face 68a will lie below the cam face 66a. Thus the cam roller 64 will ride upwardly along the inclined cam face 66b of cam segment 66 and then on to the cam face 66a while the bunch is being transferred, and the shaft 26 will be displaced axially in a direction away from the head end of the bunch in the fingers F, and the amount of this displacement may be varied by adjusting the position of cam lug 68 inwardly or outwardly. If the cam segment is adjusted so that its face 68a is aligned with cam face 66a there is no axial displacement of shaft 26, as is required for bunches whose length is such that their head ends will be deposited in the proper position in the pocket at the bunch-receiving station. The described adjustment of the cam segment 68 makes it possible to place the bunches in the molds with their head ends in the same position at all times. In this manner uniform density of the bunch heads may be obtained, which cannot be obtained by hand feeding of the bunches to the molds, wherefore the heads of hand-fed bunches will be too soft or too hard.

Figures 7, 8:
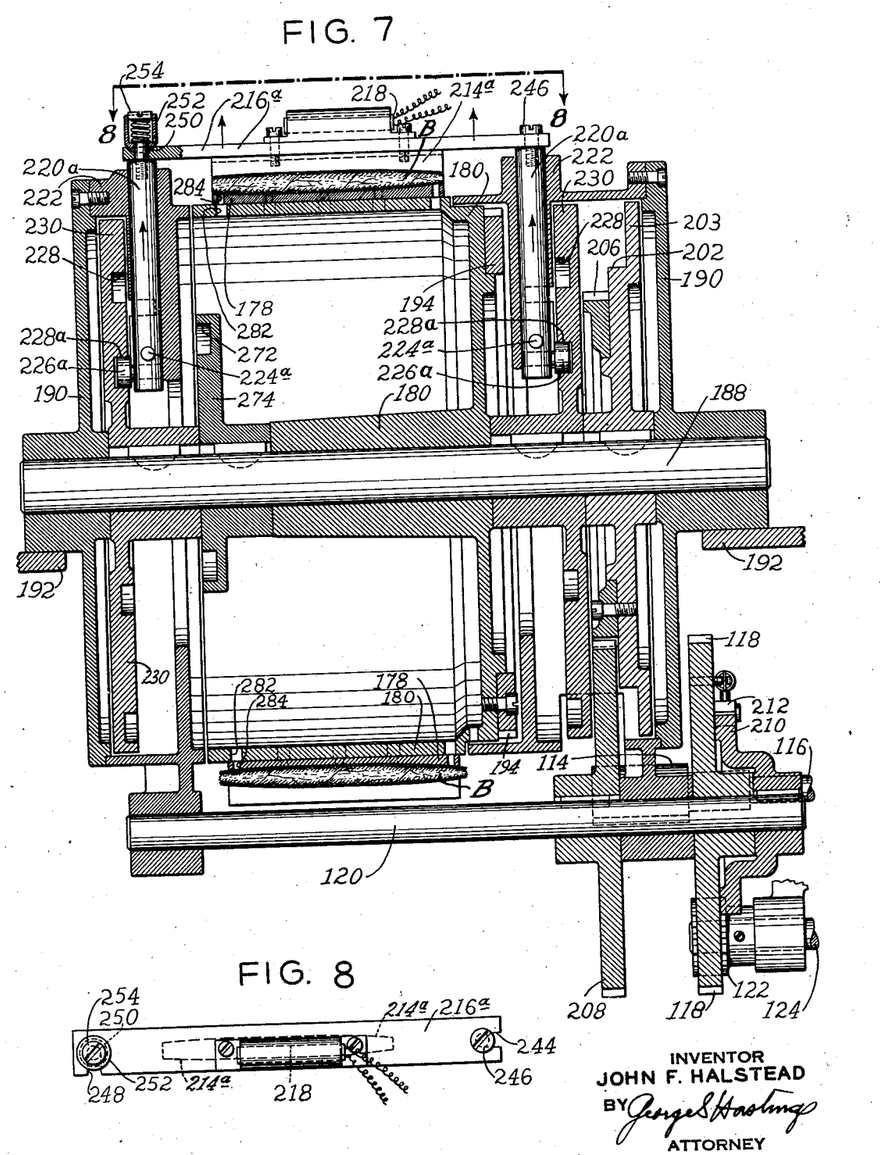
Figure 7 is also a sectional side elevation of the mold turret taken on line 7—7 of Figure 5.
Figure 8 is a plan view on line 8—8 of Figure 7 showing one shaper in detail.
Figure 9:
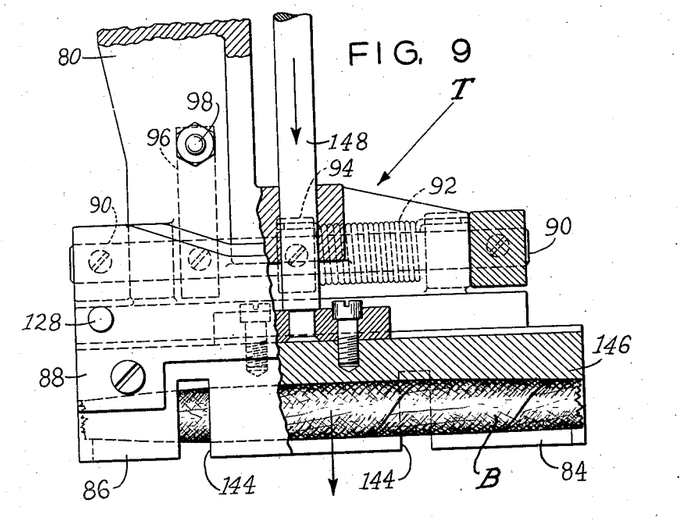
Figure 9 is a side elevation, partly in section, showing the bunch gripping jaws of the transfer arm in full size.

The fingers F deliver the cigar bunch B received from the rolling apron to an oscillating transfer T which then inserts said bunch into a mold pocket of a shaping turret. The transfer T consists of an oscillating member 80 fastened on a horizontal shaft 82 which is supported in housing 44. On the member 80 is mounted a stationary jaw 84 and swingable jaw 86. The latter is mounted on a bracket 88 fastened to a shaft 90 supported by suitable bearing lugs of member 80. A torsion spring 92 having one end anchored in collar 94 fastened to shaft 90 (Fig. 9) and its other end secured in one of the bearing lugs supporting shaft 90 serves to keep the jaw 86 closed at all times except when receiving a bunch from the fingers 20 and 22 (Fig. 2). To shaft 90 is furthermore secured a stop lug 96 which rests against an adjustable stop screw 98 when jaw 86 is closed. The shaft 82 on which member 80 is mounted carries a gear 100 which is oscillated by means of a gear segment 102 loosely mounted on shaft 50. Said gear segment is operated by means of a cam lever 104 integral with and extending downwardly from the hub of said segment. Cam lever 104 carries a roller 106 engaging with a cam track 108 of a cam 110 secured to cam shaft 60. Gear 112 meshes with an intermediate gear 114 on shaft 116 which in turn is driven by a gear 208 keyed on a shaft 120 (Fig. 7.)

The opening of jaw 86 is effected through a stud 126 (Figures 1, 2 and 3) contacting and lifting a pin 128 projecting from jaw supporting bracket 88 while the latter is swung by oscillating member 80 toward its bunch receiving position (Figure 2). Stud 126 projects from an oscillating arm 130 mounted on a shaft 132 supported by a suitable bearing of housing 44. Shaft 132 carries another arm 134 which is pivoted to an oscillating operating lever 136 loosely mounted on shaft 50. It will be observed in Figs. 1 and 3 that the pin connecting the lever 136 and arm 134 passes through a hole 135 in the arm 136 which is sufficiently greater in diameter than the pin to provide lost motion to compensate for the different arcs in which the upper ends of the lever 136 and arm 134 are moved. Lever 136 is actuated from a cam lever 138 carrying a roller 140 engaging with a cam track 142 of the gear 112 to move the pin 126 upwardly when the pin 128 is carried above it as the transfer T moves toward its receiving position, and thereby open the jaw 86. After transfer T has assumed its receiving position, arm 130 swings slightly downward, thereby releasing pin 128 and effecting the closing of jaw 86 upon the cigar bunch B inserted between the latter and jaw 84 (Fig. 2). At this moment the cigar bunch is still held by the transfer fingers F which are disposed in slots 144 of jaws 84 and 86 (Fig. 9) but as soon as member 80 starts to swing away from said fingers, the bunch easily slides out of the same, due to the hinged mounting of fingers 22. It might be pointed out that at this bunch receiving point or station the bunch will fall out from between the jaws 84 and 86 if it is too small. Moreover fingers 22 stand at such angle in relation to the swinging path of transfer arm T that it requires a minimum displacement thereof to permit the jaws 84 and 86 to slide the bunch out of said fingers, thus preventing harmful squeezing or undesired pressure on said bunch. After receiving a bunch, the transfer arm swings to the bunch delivery station shown in Figs. 1 and 5, where said bunch is ejected from jaws 84 and 86 and inserted in one of the molds of an intermittently rotating bunch shaping turret M.

Figure 10:
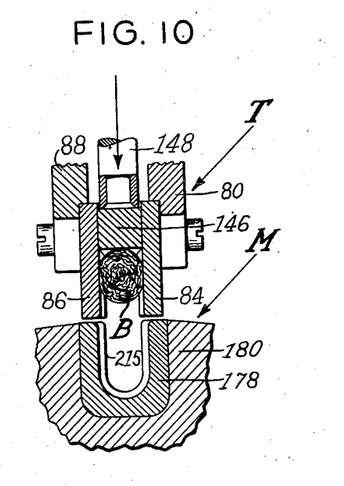
Figure 10 is a sectional end elevation of the bunch gripping jaws of the transfer arm ready to insert a bunch in a mold pocket of the turret.

The ejecting of the cigar bunch B from between jaws 84 and 86 is effected by a suitably shaped plunger 146 reciprocated between said jaws by means of a shank 148 which is slidably supported by suitable bearing lugs of transfer member 80. To shank 148 is secured a block 150 having a track 152 engaging with a roller 154 pivoted on an operating lever 156 mounted on one end of an oscillating shaft 158 supported by suitable bearings of housing 44. Shaft 158 on its other end carries an arm 160 (Fig. 3) from which projects a pin 162 which is normally held by a tension spring 164 against an arm 166 loosely mounted on shaft 158, said spring 164 yielding sufficiently to halt the ejecting movement of the plunger 146 when the ejection of the bunch from jaws 84 and 86 is obstructed. Arm 166 is connected by a link 168 (Figs. 1 and 3) to an arm 170 loosely mounted on shaft 50. Arm 170 is actuated from a cam lever 172 integral with and extending downwardly from the hub of said arm 170. Cam lever 172 carries a cam roller 174 engaging with a track 176 of the cam 58 mounted on the continuously rotating shaft 60 described heretofore. This unique hook-up between arm 170 and shaft 158 is employed for the purpose of preventing breaking or injuring the ejector plunger 146 and its mechanism in case an obstruction is encountered by the same. The oscillating motion of shaft 158 through arm 156 and track 152 effects descending motion of the ejecting plunger 146 to eject the cigar bunch at the bunch delivery station from between the jaws 84 and 86 and insert said bunch into one of the numerous mold pockets 178 which are secured upon the periphery of a bunch shaping turret 180, in a well known manner. In order to assure the insertion of the bunch into the turret mold pockets, without injury to the bunch, the adjusting screw 98 is set to permit closure of the jaw 86 to form a pocket between it and jaw 84 which is a little narrower than the width of the mold pockets 178 (Figure 10), without binding upon the plunger 146 during the transfer operation. Accordingly the bunch will be compressed between jaws 84 and 86 to a thickness less than the width of the mold pocket and its insertion in the latter will be facilitated. Another advantage lies in the fact that the center of the pivot 155 whereon roller 154 is pivoted to arm 156 is aligned with the center of shaft 82 (Figure 2), after the ejector plunger returns to its uppermost position, so that a minimum of friction and wear on the mechanism occurs during the oscillation of transfer member 80. In order to assure a correct alignment of the transfer T at the bunch receiving as well as at the bunch delivering station, member 80 is provided with a pair of lugs 182 each of which carries a stop screw 184 contacting a stop pin 186, when arm 80 reaches either the bunch receiving or delivery station.

Figure 6:
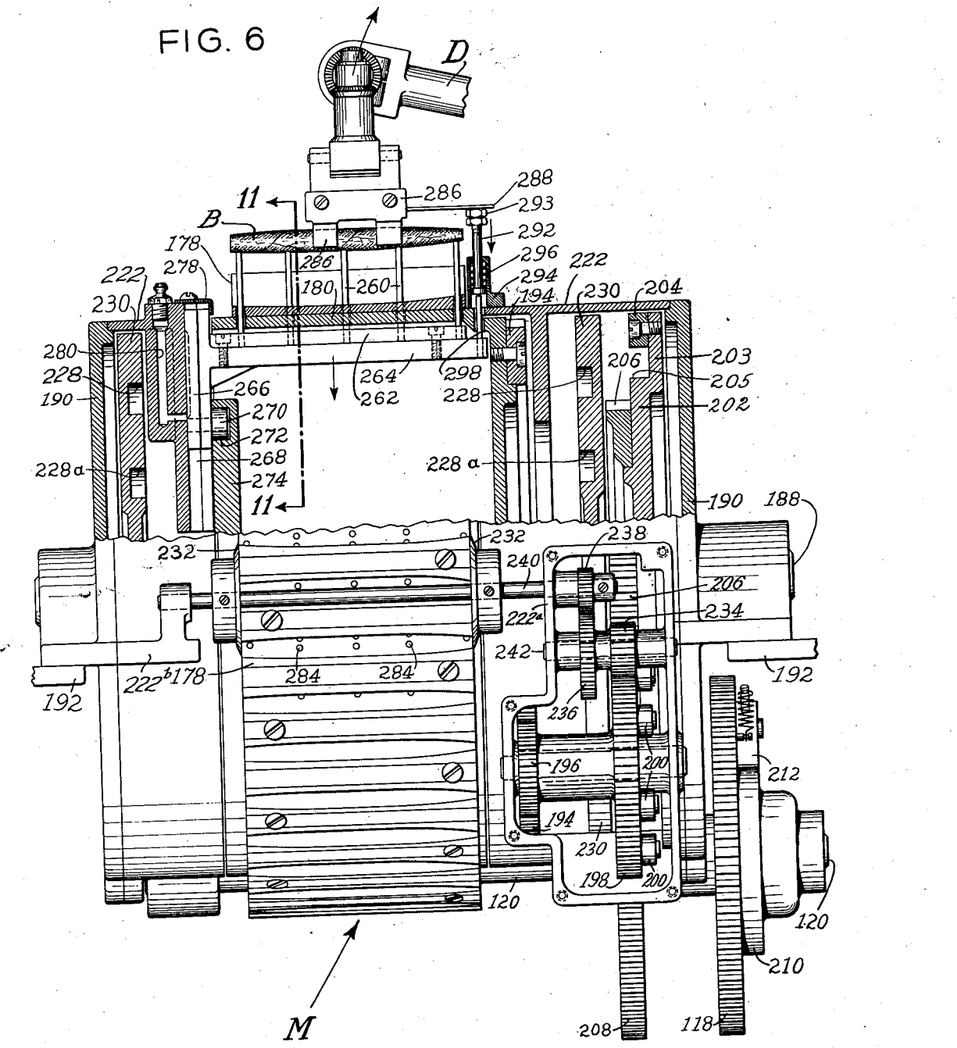
Figure 6 is a side elevation, partly in section, of the mold turret taken on line 6—6 of Figure 5.

The shaping turret M has a rotatable drum 180 which carries the mold pockets 178 upon its periphery and is loosely mounted on a horizontal shaft 188 supported by suitable bearings of a stationary housing 190 (Figure 7) attached to the main frame 192 of the cigar bunch machine (not shown). To turret drum 180 is secured a ring gear 194 which is intermittently driven by a gear 196 mounted on a spindle 197 supported by a housing 222a formed on bracket 222 (Figures 5 and 6). The hub of gear 196 is formed integrally (as shown in Figure 6) with the hub of an indexing gear 198 which is also mounted on spindle 197. Gear 198 carries a number of rollers 200 which successively engage with an index cam disk 202 having a circumferential flange 203 to which is fastened an index cam lug 204 whose inner edge is shaped (as shown in Figure 5) and disposed opposite an indentation 205 (Figure 5) in the periphery of disk 202 to provide a track in which each roller 200 enters successively. The shape of this track is such that it will displace the roller entering it to turn the gear 196 sufficiently to rotate the turret the distance between centers of adjacent mold pockets. This indexing mechanism is similar to that shown in the Wheeler Patent No. 2,157,537, except it is mounted on the turret.

Index disk 202 is mounted on shaft 188 and carries a gear 206 which is continuously driven by the gear 208 (Figures 5, 6 and 7) mounted on shaft 120. On shaft 120 is keyed a one-tooth ratchet 210 which is driven by a spring pawl 212 pivoted to a continuously driven gear 118 which is driven by gear 122 mounted on shaft 124. This construction enables the operator to turn the mold turret for cleaning the mold pockets without turning the entire machine, upon disengaging the pawl 212 from ratchet 210, and upon reengagement of the pawl with the ratchet, proper indexing and timing are assured. In operation the indexing of the turret is such that each mold stops in alignment with the respective mechanisms at the bunch loading and ejecting stations.

After the cigar bunches B are inserted into the mold pockets by the ejecting plunger 146 of the transfer T, they are advanced to a shaping station S (Figure 5) where the bunches are successively pressed into the mold pockets by a pair of shapers 214 which simultaneously enter adjoining mold pockets 178. The cavity in the mold pockets, in the particular embodiment of the invention shown, conforms to the desired shape of a cheroot, which is also called a cigarillo, and slots 215 are formed in the ends of the pockets through which the ends of the inserted bunches project. The operating faces of the shapers 214 conform to the desired shape of cheroot or cigarillo. Each shaper 214 is mounted on a cover plate 216 which carries a suitable heating element, such as an electric cartridge 218, which imparts heat to its respective shaper 214 to dry out the bunch while shaping it. The covers 216 are detachably mounted on pairs of operating rods 220 which are slidably supported by a pair of annular brackets 222 (Figs. 5 and 7) fastened to housing 190. In order to simplify construction and still assure a simultaneous operation of the two shapers 214, the operating rods 220 at each end of the two ends of cover plates 216 are connected at their lower ends by a pin 224 loosely fitting transverse holes therein, so that it is necessary to provide an operating or cam roller 226 on only one rod at each end of one of said cover plates to assure proper operation of both shapers. Each cam roller 226 is pivoted to its respective rod and engages with a cam track 228 of its respective cam 230, both cams 230 being keyed to the continuously rotating shaft 188.

After the bunch B has successively passed the two shapers at the shaping station S, the protruding ends of the bunches are cut off while passing a pair of rotary trimming knives 232 (Figures 5 and 6). Said knives are of a somewhat oval shape and are provided with cutting edges at both ends and rotate in the direction of the arrow (indicated in Figure 5) and only while a mold pocket passes the trimming station. The intermittent motion of the knives is controlled by index gear 198 which meshes with a gear 234 which is mounted on a spindle 242 carried by the housing 222a formed on one of the brackets 222 and connected with a gear 236 also mounted on spindle 242, as shown in Figure 6. Gear 236 drives a gear 238 secured to knife shaft 240 carrying the two trimming knives 232, the shaft 240 being supported by suitable bearings provided in the brackets 222, one of the shaft bearings being provided on the interior of the housing portion 222a on the right hand bracket 222 (Fig. 6) and the other bearing being provided in a lug 222b formed on the other bracket 222. The knives rotate 2½ revolutions during passage of the bunch ends across their range of action, so that the latter are engaged five times by the cutting edges of the knives. Thus the cut made by each cutting edge may be only 1/32 inch at a time instead of trimming with one cut as heretofore. After passing the trimming station, the bunches in molds 178 are engaged by a pair of shapers 214a which are of the same shape and similar construction as shapers 214 at the first shaping station S. Each shaper 214a is attached to a cover plate 216a, each of which is detachably mounted on a pair of operating rods 220a, slidably supported by the brackets 222. Each pair of rods 220a are connected by a pin 224a loosely fitting transverse holes therein, in a manner similar to the connection of rods 220 by pin 224 described above. Each pair of rods is provided with a cam roller 226a engaging with cam tracks 228a in a pair of cams 230, both of which are keyed to shaft 188.

For easy detachment or exchange of the shapers, the cover plates 216 and 216a are each provided with a slot 244 (Fig. 8) engaging with a stud 246 held by the corresponding rod 220 and 220a, respectively. The opposite end of each cover plate has also a slot 248 and a circular conical indentation 250 engaging with the lower conical portion of a spring-pressed locking member 252 supported and guided by a suitable stud 254 held by the corresponding operating rod 220 and 220a, respectively. It might also be pointed out that the heating elements 218 can be removed from their housing on covers 216 and 216a so that the cigar bunches can be shaped with or without the aid of heat, as desired.

Figure 11:
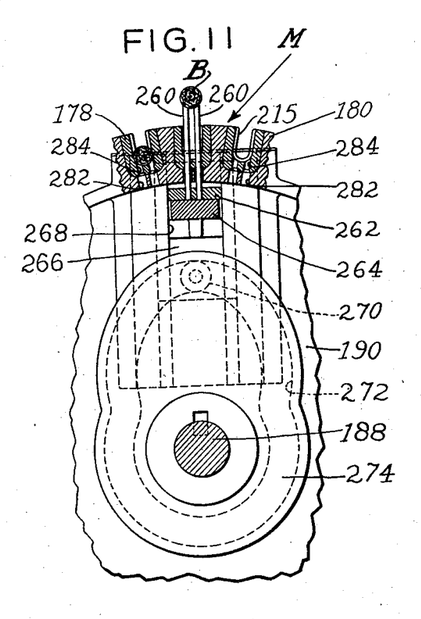
Figure 11 is a partial sectional end elevation of the mold turret illustrating the bunch ejector mechanism, taken on line 11—11 of Figure 6.

The cigar bunches leaving the second shaping station have been properly formed, trimmed and shaped, and are then removed from their respective molds at the ejecting station E where a set of suitable ejector rods 260 lift the finished bunch out of the mold and deliver the same to a bunch transfer such as illustrated in the above mentioned Patent No. 2,334,174. The ejector rods 260 (Figs. 6 and 11) are mounted on a guide bar 262 secured to a suitable bracket 264 provided with a guide flange 266 engaging with a suitable vertical guide track 268 provided in bracket 222 (Fig. 6). To flange 266 is pivoted a cam roller 270 engaging with a cam track 272 of a cam 274 mounted on shaft 188. To prevent any dust from entering into track 272, a cover plate 278 is provided on bracket 222, and by means of a convenient located oil hole 280 lubrication can be effected without the danger of dust or tobacco particles reaching the slide surfaces of the track 268 (Fig. 6). The turret drum 180 as well as the bottom portion of the molds 178 are provided with suitable holes 282 and 284 respectively, through which ejector rods 260 protrude and lift the finished cigar bunch out of the mold (Figs. 6 and 11).

The finished cigar bunch B is taken off the ejector rods by the heretofore mentioned bunch transfer D which waits with its open jaws 286 at the ejecting station E. The finished bunch B of course is pushed upward in between said open jaws of the transfer D. When the cigar bunch reaches its highest position a rod 288 protruding from the toggle joint of the toggle 290 (Fig. 5) is tripped by a spring-pressed plunger 292 which carries a nut 293 which engages rod 288 and thereby effects the closing of jaws 286. Plunger 292 is supported and guided by a suitable bracket 294 secured to bracket 222. Said plunger is normally held down by a spring 296 but is moved upward when a pin 298 held by bracket 264 contacts the bottom of said plunger during the upward movement of bracket 264 during the bunch ejecting operation. The bunch so gripped in the transfer is transported therein to wrapper-applying position (not shown). Since the details of the construction of the transfer form no part of the invention, further description thereof is deemed unnecessary since they are shown in the above mentioned Patent No. 2,334,174.

What is claimed is:

1. In a cigar machine, the combination with a member provided with pockets adapted to receive cigar bunches, and movable to advance each pocket successively to a bunch receiving station, of means for transferring cigar bunches delivered from a bunch rolling table to the pocket at said bunch receiving station, said means including a device for transferring the cigar bunches delivered from the bunch rolling table, and mechanism for removing the bunch transferred by said device and compressing the bunch to a thickness less than the width of the pocket at said bunch receiving station and inserting the compressed bunch into said pocket, said mechanism including a pair of relatively movable jaws between which a cigar bunch is inserted by said device to be compressed, an ejector movable between said jaws for delivering the compressed bunch into the pocket at the bunch-receiving station, an actuator, and a yielding connection between said actuator and ejector to move the ejector outwardly between said jaws and thereby expel the bunch into said pocket whereby an obstruction to the ejection of the bunch from between said jaws will cause said yielding connection to yield and thereby stop the outward movement of the ejector.

2. In a cigar machine having a bunch rolling table, an endless series of molds which are each provided with a pocket adapted to receive a cigar bunch, and mechanism for intermittently moving said molds to advance each pocket successively to a bunch receiving station; the combination with means for transferring cigar bunches delivered from the bunch rolling table to the pocket at said bunch receiving station, said means including a device adapted to receive cigar bunches delivered from the bunch rolling table and transfer the same laterally, and mechanism for displacing said device, while it is transferring the bunch, in a direction axially of said bunch, said mechanism including instrumentalities which may be manually regulated to cause said device to be displaced with the cigar bunch being transferred therein selectively toward or away from the head end of said cigar bunch, and also to permit transfer without axial displacement in said device of bunches delivered from the bunch rolling table.

3. In a cigar machine, the combination of a bunch transfer adapted to receive a cigar bunch from bunch rolling mechanism and transfer it to a predetermined position, and means for displacing said transfer together with the cigar bunch toward one of the ends of the bunch being transferred in said bunch transfer, said means including a device which may be manually regulated to displace said bunch transfer selectively toward or away from the head end of the cigar bunch being transferred therein.

4. In a cigar machine, the combination of a bunch transfer device adapted to receive a cigar bunch from bunch rolling mechanism and transfer it to a predetermined position, and means for displacing said device with the cigar bunch therein axially toward one of the ends of the bunch being transferred, said means including instrumentalities which may be manually regulated to displace said bunch transfer device with the cigar bunch being transferred therein selectively toward or away from the head end of said cigar bunch, and also to permit the bunch to be transferred by said device without axial displacement.

5. In a cigar machine having a series of mold pockets which are each adapted to receive a cigar bunch, the combination with means for transferring cigar bunches into said pockets, said means including a device for gripping and transferring a bunch, of mechanism for displacing said device in a direction axially of the gripped cigar bunch, said mechanism including instrumentalities which may be manually regulated to displace said device selectively toward or away from the head end of the gripped bunch to permit delivery of the bunch in one of the mold pockets with its head end in predetermined relation to the head end of the pocket.

6. In a scrap bunch cigar machine, the combination with a member provided with mold pockets adapted to receive cigar bunches, of means for moving said member to advance each of said pockets successively to a bunch-receiving station, a bunch transfer adapted to receive a cigar bunch from a bunch rolling table and transport the cigar bunch to a predetermined position, mechanism for removing the cigar bunch from said bunch transfer at said predetermined position of the bunch transfer and delivering the bunch to the pocket of said member which is located at the bunch-receiving station, and a device for displacing said bunch transfer in a direction axially of the cigar bunch being transported by the bunch transfer, said device including instrumentalities for displacing the cigar bunch transported by the transfer selectively either toward or away from the head end of said bunch, and said instrumentalities being adjustable so that the axial displacement of the cigar bunch by said transfer either toward or away from the head of the cigar bunch may be varied so that cigar bunches of different lengths will be delivered by said mechanism to the pockets of said member at the bunch-receiving station of said member with their head ends in the same position.

7. A cigar bunch transfer comprising a horizontal axially movable shaft, a pair of spaced arms mounted on said shaft, a pair of jaws mounted on each of said arms and coacting to grip an inserted cigar bunch, means for rocking said shaft to move said jaws from bunch-receiving position to a predetermined delivery position, a cam follower mounted on said shaft, a primary cam piece, a spring urging said shaft axially toward said primary cam piece to maintain said cam follower against said cam piece, said primary cam piece having a primary cam surface which engages said cam follower when said jaws are in bunch-receiving position and causes said shaft to be displaced axially against the resistance of said spring in a direction away from the head end of the cigar bunch being transferred in said jaws while said shaft is rocked to transfer the bunch in said jaws to said predetermined delivery position, an adjustable cam piece having a secondary cam surface adapted to permit said shaft to be displaced by said spring in a direction toward the head end of the cigar bunch being transported in said jaws to delivery position, and a device for moving said adjustable cam piece into a position wherein said secondary cam surface projects beyond said primary cam surface and engages said cam follower while said jaws are at bunch-receiving position whereby the bunch in said jaws will be displaced in a direction toward the head end of the bunch being transferred to the delivery position.

8. A cigar bunch transfer comprising a horizontal axially movable shaft, a pair of spaced arms mounted on said shaft, a pair of jaws mounted on each of said arms and coacting to grip an inserted cigar bunch, means for rocking said shaft to move said jaws from bunch-receiving position to a predetermined delivery position, a cam follower mounted on said shaft, a primary cam piece, a spring urging said shaft axially toward said primary cam piece to maintain said cam follower against said cam piece, said primary cam piece having a primary cam surface which engages said cam follower when said jaws are in bunch-receiving position and causes said shaft to be displaced axially against the resistance of said spring in a direction away from the head end of the cigar bunch being transferred in said jaws while said shaft is rocked to transfer the bunch in said jaws to said predetermined delivery position, an adjustable cam piece having a secondary cam surface which is parallel to the direction in which the bunch is transferred in said jaws, and a device for moving said adjustable cam piece into a position wherein said secondary cam surface engages said cam follower while said jaws are at bunch-receiving position whereby said cam follower will ride off said secondary cam surface and on to said primary cam surface while the bunch is being transferred to the delivery position and the bunch in said jaws will be displaced in a direction away from the head end of the bunch being transferred to the delivery position, said device being adjustable to vary the position of said secondary cam surface relative to said primary cam surface and thereby vary during the transfer of the bunch to delivery position the axial displacement thereof away from its head end.

9. A cigar bunch transfer comprising a horizontal axially movable shaft, a pair of spaced arms mounted on said shaft, a pair of jaws mounted on each of said arms and coacting to grip an inserted cigar bunch, means for rocking said shaft to move said jaws from bunch-receiving position to a predetermined delivery position, a cam follower mounted on said shaft, a primary cam piece, a spring urging said shaft axially toward said primary cam piece to maintain said cam follower against said cam piece, said primary cam piece having a primary cam surface which engages said cam follower when said jaws are in bunch-receiving position and causes said shaft to be displaced axially against the resistance of said spring in a direction away from the head end of the cigar bunch being transferred in said jaws while said shaft is rocked to transfer the bunch in said jaws to said predetermined delivery position, an adjustable cam piece having a secondary cam surface which is parallel to the direction in which the bunch is transferred in said jaws, and a device for moving said adjustable cam piece into a position wherein said secondary cam surface engages said cam follower while said jaws are at bunch-receiving position whereby said cam follower will ride off said secondary cam surface and on to said primary cam surface while the bunch is being transferred to the delivery position and the bunch in said jaws will be displaced in a direction away from the head end of the bunch being transferred to the delivery position, said device being adjustable to vary the position of said secondary cam surface relative to said primary cam surface and thereby vary during the transfer of the bunch to delivery position the axial displacement thereof away from its head end, said primary cam surface having an extension which is parallel to the direction in which the bunch is transferred in said jaws, and said device being adjustable to align said secondary cam surface with the extension of said primary cam surface to permit the bunch to be transferred by said jaws without axial displacement.

10. In a cigar machine, the combination with a horizontal shaft, of a pair of upright transfer fingers mounted on said shaft, gripper jaws pivotally mounted on said transfer fingers, torsion springs connected to and urging said jaws into positions to hold a cigar bunch against the upper ends of said fingers, means for turning said shaft with said fingers to move the cigar bunch held against the upper ends of said fingers by said jaws into a predetermined position at which said jaws are in a nearly horizontal position, a support pivotally mounted on a horizontal axis and adapted to be swung away from said jaws and fingers when they are at said predetermined position, and a pair of members mounted on the outer end of said support and adapted to grip the cigar bunch after it has been transferred to said predetermined position by said jaws and fingers, and remove said cigar bunch from between said fingers and jaws when said support is swung away from said jaws.

JOHN F. HALSTEAD.

REFERENCES CITED

The following references are of record in the file of this patent:

UNITED STATES PATENTS

| Number | Name | Date |
|---|---|---|
| Re. 20,441 | Clausen | July 13, 1937 |
| 260,638 | Bach | July 4, 1882 |
| 591,250 | Georgii | Oct. 5, 1897 |
| 1,024,632 | Jenkins | Apr. 30, 1912 |
| 1,184,444 | Grahl | May 23, 1916 |
| 1,599,962 | Halstead | Sept. 14, 1926 |
| 1,786,609 | Halstead | Dec. 30, 1930 |
| 1,838,157 | Rundell | Dec. 29, 1931 |
| 1,982,292 | Granstedt | Nov. 27, 1934 |
| 2,022,575 | Stelzer | Nov. 26, 1935 |
| 2,241,069 | Kasper | May 6, 1941 |
| 2,349,320 | Wheeler | May 23, 1944 |
| 2,356,636 | Wheeler | Aug. 22, 1944 |